United States Patent [19]

Schenkel et al.

[11] 4,291,855
[45] Sep. 29, 1981

[54] PIPE CLAMP

[75] Inventors: Willi Schenkel, Zurich; Hans Seger, Schwerzenbach, both of Switzerland

[73] Assignee: Egli, Fischer & Co. AG, Zurich, Switzerland

[21] Appl. No.: 777,526

[22] Filed: Mar. 14, 1977

[30] Foreign Application Priority Data

Mar. 15, 1976 [CH] Switzerland ................. 3168/76

[51] Int. Cl.³ ............................................. F16L 3/08
[52] U.S. Cl. ................................ 248/74 A; 24/339; 24/249 R; 24/255 SL
[58] Field of Search ............ 24/73 AP, 73 PB, 73 SA, 24/254, 249 R, 255 SL; 248/74 A, 74 B, 74 R, 74 PB, 73

[56] References Cited

U.S. PATENT DOCUMENTS

| | | | |
|---|---|---|---|
| 3,090,826 | 5/1963 | Cochran | 24/73 AP |
| 3,807,675 | 4/1974 | Seckerson et al. | 24/73 SA |
| 3,954,238 | 5/1976 | Nivet | 248/74 PB |

FOREIGN PATENT DOCUMENTS

| | | | |
|---|---|---|---|
| 871021 | 3/1953 | Fed. Rep. of Germany | 248/74 R |
| 1687021 | 8/1954 | Fed. Rep. of Germany | . |
| 1274464 | 3/1963 | Fed. Rep. of Germany | . |
| 1246074 | 10/1965 | Fed. Rep. of Germany | . |
| 1817814 | 12/1967 | Fed. Rep. of Germany | . |
| 1966378 | 3/1968 | Fed. Rep. of Germany | . |
| 1946244 | 9/1969 | Fed. Rep. of Germany | . |
| 7207527 | 2/1972 | Fed. Rep. of Germany | . |
| 7222855 | 6/1972 | Fed. Rep. of Germany | . |
| 7334806 | 9/1973 | Fed. Rep. of Germany | . |
| 2362931 | 12/1973 | Fed. Rep. of Germany | . |
| 2455866 | 6/1975 | Fed. Rep. of Germany | . |
| 1338602 | 11/1973 | United Kingdom | . |

*Primary Examiner*—Kenneth Dorner
*Attorney, Agent, or Firm*—Werner W. Kleeman

[57] ABSTRACT

A pipe clamp comprising two clamp segments mounted at an attachment component, these clamp segments can be detachably connected with one another when assuming their closed position. The clamp segments are anchored at the attachment component by means of a respective hinge disposed between their end sections. At the ends of the clamp sections which face away from the attachment component, these clamp segment-ends possess cooperating parts of a locking means for releasably connecting such clamp segments with one another.

9 Claims, 2 Drawing Figures

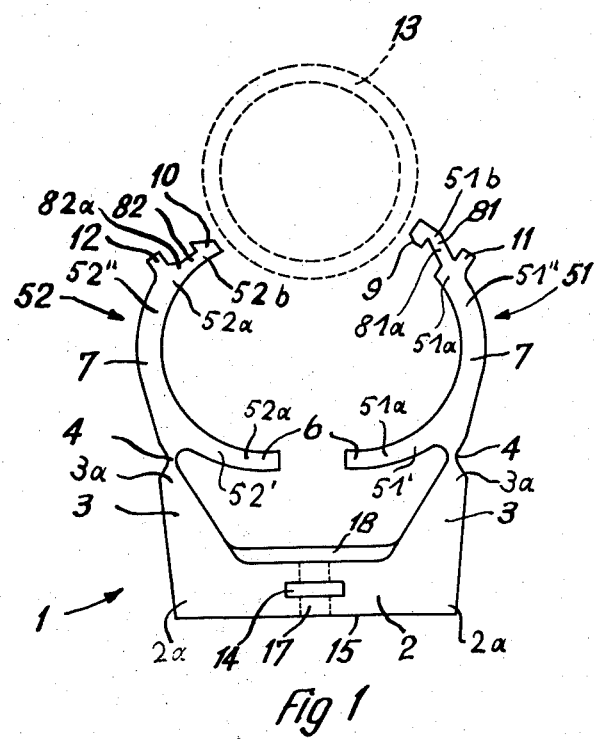
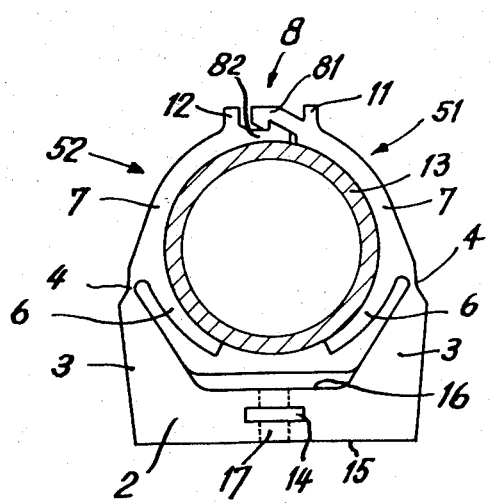

PIPE CLAMP

BACKGROUND OF THE INVENTION

The present invention relates to a new and improved construction of a pipe clamp or saddle which is of the type comprising two pipe clamp segments mounted at an attachment component or element, these clamp segments can be detachably or releasably interconnected with one another in a closed position of the pipe clamp.

SUMMARY OF THE INVENTION

It is a primary object of the present invention to provide a new and improved construction of pipe clamp which is relatively simple in design, economical to manufacture, easy to use, and enables a pipe or the like to be easily mounted at or dismantled from, as the case may be, such pipe clamp.

Yet a further significant object of the present invention aims at providing a simple construction of pipe clamp which is capable of firmly retaining a pipe or the like at the pipe clamp, enables the pipe to be inserted and fixed at the pipe clamp easily, and, when necessary, again removed without difficulty.

Still a further significant object of the present invention is concerned with a pipe saddle or the like of simple construction, and therefore economical to manufacture, requiring very few parts, and having a structure which enables a pipe to be mounted at the pipe saddle easily and yet positively retained thereat.

Now in order to implement these and still further objects of the invention, which will become more readily apparent as the description proceeds, the pipe clamp or equivalent device of this development is manifested by the features that the clamp segments are each anchored at the attachment component by means of a hinge effective at a location between the end sections of the associated clamp segment. The ends of such clamp segments which face away from the attachment component are interconnected by cooperating parts of a locking or closure means.

With this constructional manifestation, each of the clamp segments constitutes a double-arm lever which is anchored at the attachment component. If the pipe is introduced between the clamp segments of the opened pipe clamp or saddle and urged in the direction of the attachment component, so that at the same time the pipe is pressed against the one respective arm of the clamp segments, then these clamp segments are rocked towards one another in a pincer- or clamp-like manner and brought into their closed position. Then the locking means or lock can be easily closed. This is especially true for a preferred constructional embodiment of such pipe clamp, wherein the locking means is constructed as a snap-type lock or closure catch. In this case it is basically possible to reduce the pipe mounting operation to a single manipulation—this being especially true when working with smaller size pipe clamps and pipes—since with a suitable construction of the snap lock or snap closure means it is possible to close the pipe clamp simply by excerting a force or blow upon the pipe, which force or the like is directed towards the attachment component.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 illustrates a one-piece pipe clamp formed of plastic and shown in its opened position as viewed from the side; and FIG. 2 illustrates the pipe clamp of FIG. 1 in its closed position, further showing in cross-section a pipe or conduit about which engages the pipe clamp segments of the pipe clamp or saddle.

DETAILED DESCRIPTION OF THE PREFERRED EMBODIMENTS

Describing now the drawings, with the exemplary embodiment of pipe clamp or saddle—hereinafter simply referred to as pipe clamp—shown in FIGS. 1 and 2, it will be understood that the attachment component or element, generally designated by reference character 1, comprises a base or socket plate 2 carrying at both of its ends 2a a respective protruding arm 3 or equivalent structure. At the ends 3a of the arms 3 which face away from the base plate 2 these arms 3 are connected by means of hinge grooves 4 with the related pipe clamp segments 51 and 52, also sometimes simply referred to herein as clamp segments. The hinge grooves or hinge means 4 basically are located in offset relation towards the attachment component 1 between the end sections 51a, 51b and 52a, 52b of the clamp segments 51 and 52, respectively, in the embodiment under discussion related to the center of the relevant clamp segment. The clamp segments 51 and 52 which are articulated in this manner at the attachment component or element 1, and as will be readily seen by referring to FIG. 1, provide double-arm levers 51', 51" and 52', 52". In particular, it will be seen that each such double-arm lever 51', 51" and 52', 52" comprises a first respective lever arm 51' and 52' formed by a shorter segment section 6 of the related clamp segment 51 and 52 respectively, and a second respective lever arm 51" and 52" formed by a longer segment section 7 of the corresponding clamp segments 51 and 52 respectively.

At their free ends 51b and 52b these segments 51 and 52 respectively, possess parts of a snap-type locking means or snap closure means, generally designated in its entirety by reference character 8 in FIG. 2. Both closure parts or portions 81 and 82 are of substantially hook-like configuration, and specifically, the closure portion or part 81 of the clamp segment 51 is structured as an inwardly directed hook 81a and the closure portion or part 82 of the clamp segment 52 is structured as an outwardly directed hook 82a. The closure portion or part 81 will be seen to further include an inwardly directed inclined surface 9 and the closure portion or part 82 will be seen to possess an outwardly directed inclined surface 10. Upon placement of the clamp segments 51 and 52 into their closed position, as shown in FIG. 2, these inclined surfaces 9 and 10 contact one another in order to facilitate the mutual hooking engagement of the closure or locking parts 81 and 82. Near the locking parts 81 and 82 the clamp segments 51 and 52 respectively, each possess a cam or projection 11 and 12 respectively. These cams or projections 11 and 12 serve as a means for applying a pliers or other tool, which can be possibly used, if needed, when hooking together the locking parts 81 and 82 of the pipe clamp.

The mounting of a pipe or conduit or equivalent structure—indicated by reference character 13 in phantom lines in FIG. 1 and in cross-section in FIG. 2— therefore as a general rule can be accomplished without the need to resort to any tool. If the pipe 13 is introduced between the opened clamp segments 51 and 52, as shown in FIG. 1, and then pressed in the direction of the attachment component or element 1, then such pipe 13 acts upon the sections 6 of the segments 51 and 52 which function as the shorter lever arms 51' and 52' respectively, so that the clamp segments 51 and 52 are moved with what may be considered a pliers-like action in the direction of their closed position shown in FIG. 2. Now if a sufficiently large force, if necessary a blow, is excerted upon the pipe 13 in the direction of the attachment component 1, then, the locking parts 81 and 82, due to the provision of the inclined surfaces 9 and 10, move past one another until they hook into one another by means of the cooperating hooks 81a and 82a. The pipe clamp or saddle which is closed in this manner or with the aid of a pliers, faultlessly retains the pipe 13 seated in the pipe clamp. Jumping-open of the locking means 81, 82, under the action of transverse forces exerted upon the pipe 13, is not possible within the limits of the tensile strength of the material from which the pipe clamp is formed. Furthermore, the pipe clamp—in the event that this is required for any reason—can be easily again opened with the aid of a simple tool, such as typically a screwdriver. This can be accomplished by bracing the front end of such screwdriver or a similar tool at the cam or projection 12 and at the locking part 81 in order to be effective at the region of the inclined surface 9. It will be therefore evident that the locking hooks 81a and 82a will then easily snap open, to thereby allow release of the pipe 13. It is also possible for both of the locking or closure parts 81 and 82 to be laterally shifted towards one another and to apply the screwdriver or otherwise from the side at the locking part 81.

The section 6 of each of the clamping segments 51 and 52 possesses a slightly greater elasticity in contrast to that of the section 7 of such clamp segments, in order to thereby compensate for any deviations of the pipe 13 from its nominal or rated size. The clamp segments 51 and 52 are advantageously dimensioned such that within the contemplated tolerance range the pipe 13 is tightly enclosed and thus also fixedly retained against shifting in lengthwise direction. As mentioned, the elasticity of the sections 6 thus can be greater than that of the sections 7. These sections 7 of the clamp segments 51 and 52 can be provided, for instance, with reinforcement ribs or equivalent structure.

As to the construction of the base or socket plate 2 it will be seen that the same possesses a transverse slot 14. At the region of this transverse slot 14 there extends between the support or contact surface 15 of the base plate 2 and the upper surface 16 of such base plate a recess 17. This recess 17 allows the insertion of an attachment element, for instance a screw or the like. The transverse slot 14 can receive a substantially plate-shaped nut member. The recess 17 possesses an elongate cross-section which extends in the lengthwise direction of the base plate 2, in order to compensate for irregularities which are present during assembly. At the one side of the base plate 2, which faces away from the observer of the drawings, this base plate 2 possesses a reinforcement web 18 which extends between the arms 3. At the opposite side the wall of the base plate 2—such base plate and the arms 3 are of hollow construction for reasons of molding fabrication—is constructed to be stronger, in order to be able to dispense with the need for a second reinforcement web. Consequently, there is realized good accessibility for a tool, for instance a screw driver.

The heretofore described pipe clamp or saddle can also be used in pairs, in which case both units bear against one another by means of their contact surfaces 15 and are interconnected with the aid of a screw or other suitable fastening device. Hence, with this arrangement it is possible to attach at, for instance, an already mounted pipe which is secured to the ceiling or at a wall, a second pipe of the same or diffferent size.

The described pipe clamp of the construction herein disclosed can be fabricated of plastic by injection molding. Basically, however, both as concerns the selection of the material as well as with regard to the construction of the pipe clamp, different variations are readily possible. Thus, for instance, instead of using plastic it would be possible to construct the pipe clamp of metal, possibly with a plastic covering or coating. Furthermore, both of the clamp segments could be fabricated as separate parts and each anchored with the aid of a hinge shaft or the like at the attachment component. Also, the locking means need not necessarily be designed as a snap lock or closure. In particular, in the case of heavy-duty pipe clamps it would be possible to use a threaded closure, a so-called beer bottle closure or other suitable or equivalent closure mechanism. Even in these cases it will be found, however, to be advantageous that due to the mounting of the pipe the clamp segments will be moved into their closed position, similar to the arms of a pair of pliers. This result is essentially only dependent upon the fact that the clamp segments are subdivided into two sections by the related hinges. The ratio of the length between both sections is freely selectable within wide limits. In any event, shifting of the hinges in the direction of the attachment component enables realizing a space-saving construction in radial direction.

While there are shown and described present preferred embodiments of the invention, it is to be distinctly understood that the invention is not limited thereto, but may be otherwise variously embodied and practiced within the scope of the following claims.
ACCORDINGLY,

What we claim is:

1. A pipe clamp for clamping a pipe comprising:
    an essentially rigid attachment component including a pair of essentially rigid protruding arms with end portions terminating at respective hinge means;
    a pair of clamp segments capable of being releasably interconnected with one another carried by said protruding arms;
    each clamp segment having upper, lower and intermediate sections;
    hinge means positioned between said end portion of each protruding arm and said intermediate section of said clamp segment for pivoting said clamp segment with respect to said protruding arm when said lower section of said clamp segment is engaged by said pipe being clamped;
    said upper section of each clamp segment which faces away from the attachment component having its end provided with a locking part cooperating with the locking part at the end of the other clamp segment;
    said cooperating locking parts providing locking means for releasably interconnecting said clamp segments,
    said locking means being automatically actuatable by the insertion of said pipe into said clamp segments whereby said inserted pipe is engaged in secured relationship within said clamp segments.

2. The pipe clamp as defined in claim 1, wherein: said locking means comprises snap-closure means.

3. The pipe clamp as defined in claim 1, wherein: the locking part of at least one of the segments comprises a hook-like locking part; said other clamp segment having a recess into which engages said hook-like locking part.

4. The pipe clamp as defined in claim 1, wherein: the locking part of each segment comprises a respective hook-like locking part which mutually engage with one another.

5. The pipe clamp as defined in claim 1, wherein: said attachment component and said clamp segments are formed of one-piece from plastic; said attachment component and said one-piece clamp segments being interconnected with one another at a respective hinge groove each defining one of said hinges.

6. The pipe clamp as defined in claim 5, wherein: each of said clamp segments has a section which extends from its hinge groove to said locking part which is less elastic than another section of such clamping segment which confronts the attachment component.

7. The pipe clamp as defined in claim 5, wherein: said attachment component comprises a base plate having opposite ends at which there is supported an associated one of said clamp segments; each end of said base plate having an arm extending towards the hinge of the related clamp segment.

8. The pipe clamp as defined in claim 7, wherein: said base plate includes a contact surface; said base plate further comprising a transverse slot extending substantially parallel to said contact surface and serving for the reception of a plate-shaped threaded nut; and said base plate having an upper surface and provided with a continuous recess at the region of said transverse slot, said continuous recess extending between such contact surface and the upper surface of said base plate.

9. The pipe clamp as defined in claim 1, wherein: said hinges are dispositioned to coact with said rigid attachment component such that the spacing between the hinges remains essentially constant.

* * * * *